United States Patent [19]
Robidoux et al.

[11] Patent Number: 5,231,600
[45] Date of Patent: Jul. 27, 1993

[54] OVERFLOW DETECTOR FOR ANTICIPATING PRODUCING INVALID OPERANDS RESULTING FROM PERFORMING SHIFT OPERATIONS ON SUCH OPERANDS

[75] Inventors: Raymond C. Robidoux, Derry, N.H.; Michel M. Raguin, Medford; Peili Lin, Malden, both of Mass.; Keith S. Carvalho, Nashua, N.H.

[73] Assignee: Bull HN Information Systems Inc., Billerica, Mass.

[21] Appl. No.: 511,125

[22] Filed: Apr. 19, 1990

[51] Int. Cl.⁵ ............................................. G06F 7/38
[52] U.S. Cl. ................................................... 364/745
[58] Field of Search ........... 364/745, 748, 737, 715.04, 364/715.08

[56] References Cited

U.S. PATENT DOCUMENTS

| | | | |
|---|---|---|---|
| 4,366,548 | 12/1982 | Kregness et al. | 364/737 X |
| 4,379,338 | 4/1983 | Nishtani et al. | 364/745 |
| 4,700,324 | 10/1987 | Doi et al. | 364/745 |
| 4,779,220 | 10/1988 | Nukiyama | 364/748 |
| 4,811,268 | 3/1989 | Nishitani et al. | 364/745 |
| 4,817,047 | 3/1989 | Nishitani et al. | 364/754 |
| 4,839,846 | 6/1989 | Hirose et al. | 364/748 |
| 4,899,304 | 2/1990 | Terane et al. | 364/745 |
| 4,922,446 | 5/1990 | Zurawski et al. | 364/748 |
| 4,941,119 | 7/1990 | Moline | 364/745 |

*Primary Examiner*—Tan V. Mai
*Attorney, Agent, or Firm*—Faith F. Driscoll; John S. Solakian

[57] ABSTRACT

Overflow detector connects in parallel with a shifter to receive the bits of an operand to be shifted for detecting an overflow condition by defining the location of the operand sign bit and detecting a predetermined change in operand bit position value. The detector generates a binary value indicating the bit position where the change occurred. This value is then compared with a value designating the number of shifts to be performed on the operand by the shifter. When the number of shifts is greater or equal to the binary value denoting the bit position, the detector signals the presence of an overflow condition.

14 Claims, 3 Drawing Sheets

OVERFLOW DETECTOR FOR ANTICIPATING PRODUCING INVALID OPERANDS RESULTING FROM PERFORMING SHIFT OPERATIONS ON SUCH OPERANDS

RELATED APPLICATION

The patent application of Glenn P. Kosteva, Peli Lin, Michel M. Raguin and Raymond C. Robidoux entitled, "Shifter Apparatus," bearing U.S. Ser. No. 453,559 filed on Dec. 20, 1989, which is assigned to the same assignee as named herein and issued as U.S. Pat. No. 5,027,300 on Jan. 25, 1991.

BACKGROUND OF THE INVENTION

1. Field of Use

The present invention relates to arithmetic processing apparatus and more particularly to apparatus for detecting the presence of invalid operands.

2. Prior Art

During the process of executing certain types of arithmetic operations, such as shift left operations, it is possible that the operand being shifted may become invalid. To maintain system integrity, it becomes necessary to be able to detect and identify this event as an overflow condition. This is normally done by detecting that the resultant operand lost significant bits and then setting an overflow indicator register.

In one prior art system, the overflow condition was detected by checking the validity of the sign bit and operand after each cycle of the shifting operation. It was found that this process was very time consuming and required a substantial amount of logic circuits. Accordingly, when this type of arrangement is implemented in macrocell array form, it is too slow and requires a considerable amount of chip area.

Accordingly, it is a primary object of the present invention to provide an arrangement for detecting overflow conditions within a minimum amount of time.

It is a further object of the present invention to provide a scheme which requires a small amount of circuits so as to be readily implementable in macrocell array form.

SUMMARY OF THE INVENTION

The above and other objects are achieved in a preferred embodiment of the present invention in which overflow apparatus connects in parallel with the apparatus which is to perform arithmetic operations on an input operand. The overflow apparatus includes means for detecting a predetermined change of state in operand bits and generating a binary value designating the bit position at which the change occurred. This value is compared with a numerical value designating the number of bit positions the input operand is to be shifted. When the numerical value is equal to or greater than the binary value, the overflow apparatus signals a potential overflow condition.

By having the above operation proceed in parallel with the operation being performed on the input operand, it is possible to complete the execution of certain types of arithmetic instructions within a single cycle of operation. In the preferred embodiment, these types of instructions include arithmetic shift left instructions.

Another advantage of the present invention is that it requires less space and fewer circuits when implemented in macrocell form.

The above and other objects and advantages of the present invention will be better understood from the following description taken in conjunction with the accompanying drawings.

DETAILED DESCRIPTION OF THE PREFERRED EMBODIMENT

Figure 1:
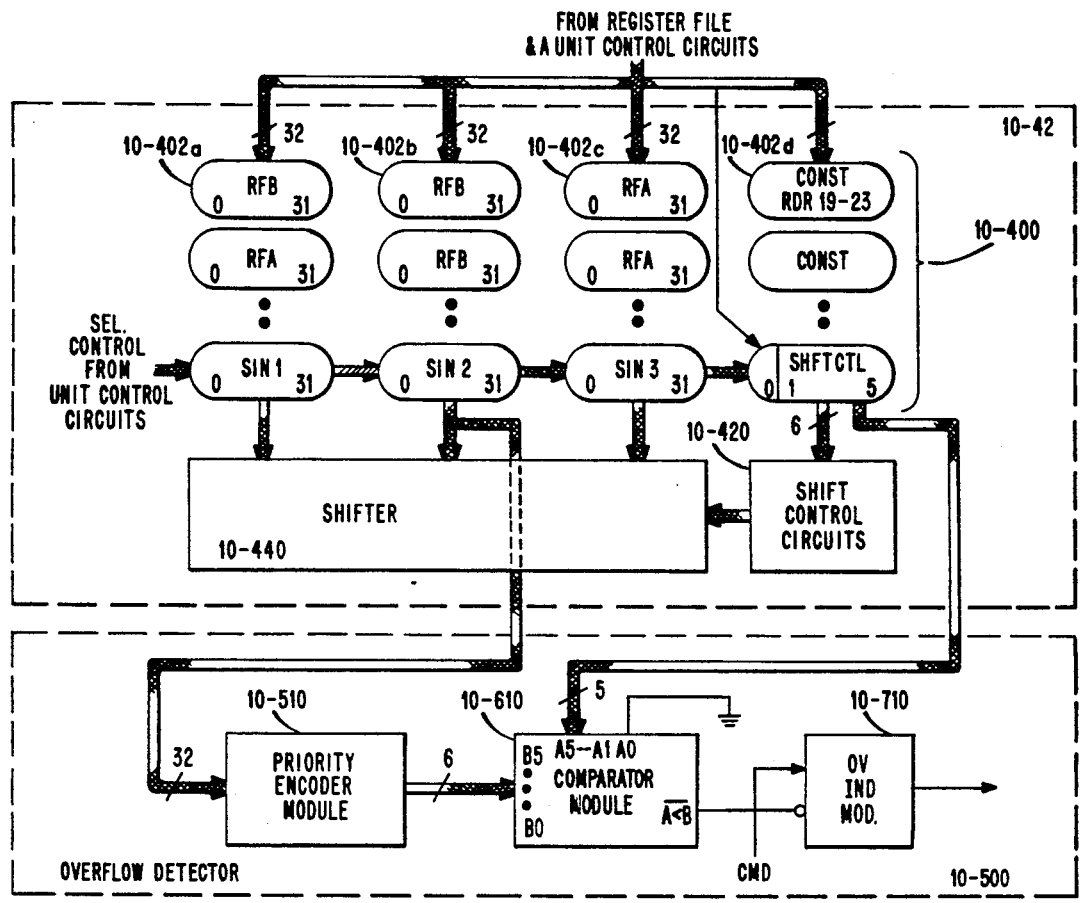
FIG. 1 is a block diagram of a system which includes the overflow detector of the present invention.

FIG. 1 shows in block diagram form, a portion of an arithmetic unit of an address unit (A unit) 10 which includes the overflow detector of the present invention. As shown, A unit 10 includes a shifter 10-42 which is capable of performing shifting operations within a single CPU cycle or machine cycle of operation. To achieve the benefit of this performance, it is important for other elements involved in the operation operate as fast as possible as discussed herein.

As shown, shifter 10-42 has an input section 10-400, a shifter control circuit 10-420 and a two level shift network 10-440. The input section 10-400 includes a plurality of operand input multiposition selection switches 10-402a through 10-402c designated as SIN1, SIN2 and SIN3 which connect to ports of a register file memory not shown. A further multiposition switch 10-420d is connected to receive shift control signals from the A unit control circuits (e.g. instruction register, control store output register RDR) which are not shown.

Each of the switches 10-402a through 10-402c receive a number of control signals from the RDR register which select which input source is connected to apply signals to the output terminals of switches SIN1, SIN2 and SIN3. The control signals are derived from different control fields included within the microinstruction word contained in the RDR register.

The shift control 10-420 receives a 5-bit function code corresponding to signals SHIFT1 through SHIFT5 from any one of the sources which connect to control switch 10-402d. A sixth signal corresponding to signal SHIFT0 is provided by bit position of the RDR register. The shift control 10-420 includes a number of logic gates which decode the 6-bit code into two sets of signals used to control the operation of shifter network 10-440.

For further information regarding shift control circuits 10-420 and shifter network 10-440, reference may be made to the related application.

As seen from FIG. 1, the overflow detector 10-500 connects to SIN2 switch 10-402b and control switch 10-402d in parallel with shifter network 10-440 for receiving input operand signals and shift control signals respectively. The overflow detector 10-500 includes a priority encoder module 10-510, a comparator module 10-610 and a indicator module 10-710 which connect in series as shown.

The priority encoder module 10-510 is connected to a 32-bit wide bus for receiving a set of input operand signals from the output of SIN2 switch 10-402b which are applied to a set of bus inputs. The module 10-510 also receives an operand sign bit signal which is applied to a polarity select (POLSEL) input. The state of signal POLSEL defines if the operand is positive or negative.

That is, a binary ZERO indicates that the operand is positive while a binary ONE indicates that the operand is negative. In the latter, the operand bits are complemented.

Priority encoder module 10-510 operates to detect a predetermined change in operand bit value such as a binary ZERO to binary ONE change occurring in the input operand bit signals. It generates as an output, a five bit binary code value indicating in which one of the 32 bit positions the change occurred. The module also generates an additional signal defining another characteristic of input operand (e.g. the presence of an all ZERO input operand).

Figure 2A:
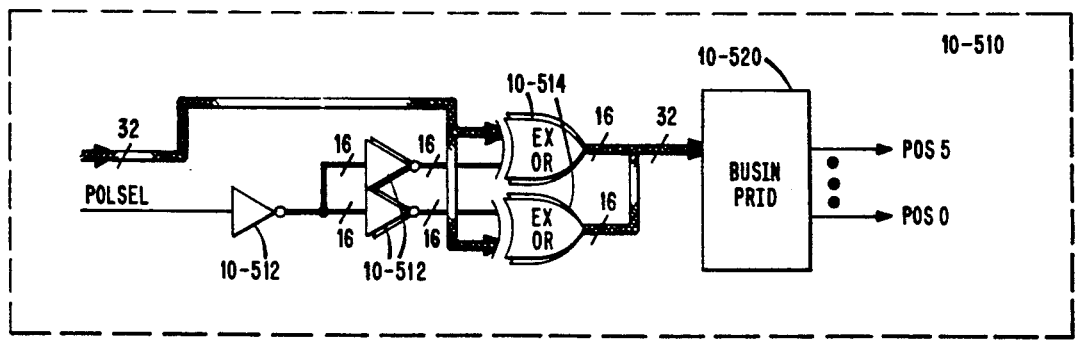
FIGS. 2a and 2b show in greater detail, different portions of the system and detector of FIG. 1.

FIG. 2a is a block diagram of priority module 10-510. As shown, the module includes a plurality of inverter circuits 10-512 included for signal driving purposes, a plurality of exclusive or (EX-OR) circuits 10-514 which are divided into two groups for loading purposes and a priority detector block 10-520 which provides an output on lines POS0 and POS5.

Figure 2B:
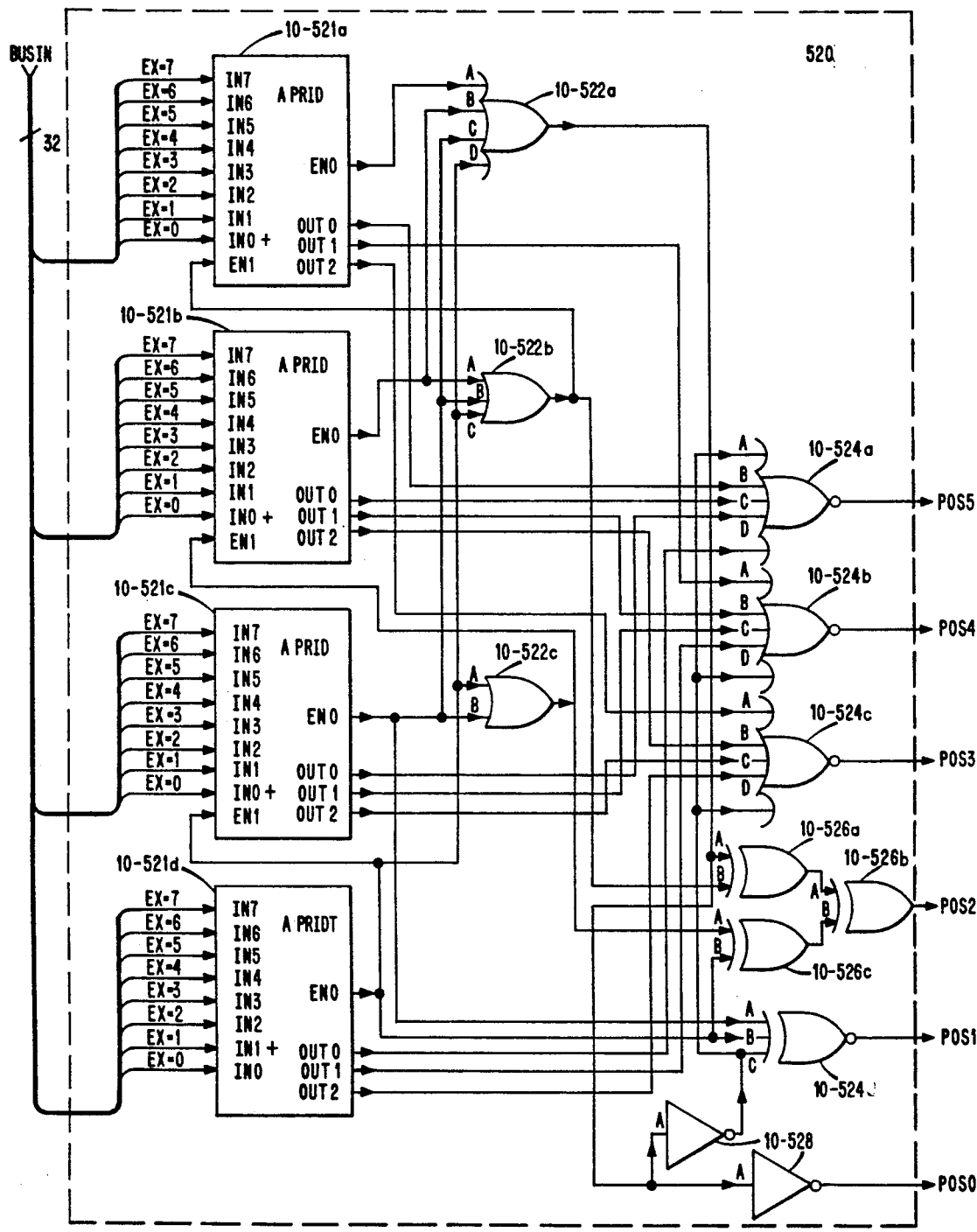

FIG. 2b shown in greater detail, the circuits of block 10-520. FIG. 2b, it is seen that block 10-520 includes a plurality of 8 to 3 priority encoder circuits 10-512a through 10-521d whose enable outputs (ENO) with the exception of circuit 10-520a connects in a series parallel arrangement via OR gate circuits 10-522a through 10-522c as shown. This arrangement provides faster encoding by having the first priority encoder circuit detecting a change in bit position value inhibit the operation of the remaining priority encoders circuits.

The sets of three output form each priority encoder circuit are combined within a plurality of NOR gate circuits 10-524a through 10-524d to produce outputs on lines POS1, POS3 through POS5 as shown. A set of exclusive or (EXOR) gate circuits 10-526a through 10-526c combine each of the enable outputs ENO to produce an output on line POS2. The inverter circuits 10-528 invert the result of ORing all of the enable outputs ENO so as to provide the proper polarity for the output applied to line POS0 as explained herein.

For the purpose of the present invention, the 8 to 3 priority encoder circuit of FIG. 2b may be implemented using combinations of NAND gate circuits and inverter circuits. The arrangement may take the form of a standard priority encoder circuit such as the 74S148 part manufactured by Texas Instruments Corporation. Except for the omission of the input enable (ENI) circuits in priority encoder circuit 10-521d, all of the priority circuits are the same.

The output of module 10-510 is applied as one set of inputs (B input) to comparator module 10-610. The comparator module 10-610 connects to the output of shift control switch 10-402d to receive a second set of inputs (A input) corresponding to a shift distance code designating the number of shifts to be performed on the input operand. The comparator module 10-610 operates to compare the sets of binary values applied to its A and B inputs and generate an output at A<B terminal indicating when the number of shifts value applied to the A input is equal to or greater than the binary value applied to the B input. This output is inverted and applied as a set input of the overflow indicator storage device 10-710 as shown. The device 10-710 is enabled by a microinstruction command from the A unit control circuits. The comparator module 10-610 can be implemented using standard macrocell parts such as the magnitude comparator part manufactured by LSI Logic Corporation.

DESCRIPTION OF OPERATION

With reference to the flow diagram of FIG. 3, the operation of the overflow detector of the present invention will now be described. As previously discussed, the A unit shifter 10-42 performs operations specified by a number of different types of program instructions. Pertinent to the present invention are the arithmetic shift instructions and in particular, the arithmetic shift left instructions. For this type of instruction, it is important to detect the presence of an overflow condition.

The present invention provides the facility for detecting an overflow condition while an arithmetic operation is being performed on the operand by shifter 10-42. Thus, the overflow detector in effect anticipates the presence of an overflow condition thereby increasing the performance of the A unit.

The above becomes very important particularly where long operands are involved. In the case of arithmetic shift left instructions, the input operand is applied to shifter 10-42 through a selected position of SIN2 switch 10-402b. At the same time, the shift control circuits 10-420 receive a shift distance value from a selected position of the SHFTCTL control switch 10-402d. This value can specify the shifting of the single input operand from 0 to 3 bit positions within a time period which enables the instruction to be completed within a single CPU cycle. The selection of the different switch positions is made under the control of specific fields of microinstruction words read out into the RDR register during a machine cycle of operation in response to such instructions.

Each A unit machine cycle is 140 nanoseconds. During the first part of the cycle, the contents of an A unit register file location are read out. During the remaining part of the cycle, the A unit performs the operation specified by the instruction. Near the end of the cycle, the resulting shifted operand is normally applied to the register file memory and written into the designated location. Also, near the end of the cycle, a microcommand signal is generated for storing an overflow indication signal generated by detector 10-500 in the overflow indicator 10-710.

According to the present invention, the overflow detector 10-500 is able to generate an output for indicating whether or not an overflow condition will arise as a result of performing the specific arithmetic instruction. It will be appreciated that an overflow condition actually indicates that the operand resulting from having performed the specified operation will be invalid. That is, consider the case in which an add arithmetic operation is performed on the following two five bit operands both with positive signs represented by a binary ZERO value:

```
  01111
  00001
  -----
  10000.
```

When the add is performed, the result resembles a negative number in that the sign bit changed from a binary ZERO to a binary ONE.

In the case of a shift operation, when an operand having a value of 8 (01000) is shifted left by one bit position (multiplied by 2), the result is 10000. This is another example of overflow in that the answer instead of being 16 is instead −16. When the same operand is shifted left by 2 positions equivalent to being multiplied by 4, the answer is 00000. Here the answer instead of being equal to 32, the result although positive has no relationship to the old number. It looks like a result of ZERO.

From this, it is seen that the result of performing an arithmetic operation on the input operand may cause the input operand to exceed the number range of the A unit resulting in an overflow condition. This occurrence is recorded since it is the programmer's responsibility to anticipate such possible occurrences and to avoid any halt in operation.

Also, from the above, it is seen that if the number of left shifts is equal to or greater than the bit position of the first non-ZERO bit, an overflow condition will occur. In the case of a negative number, the input operand is complemented, then the same rule is applied relative to the first non-ZERO bit position.

For ease of explanation, the operation of overflow detector 10-500 will be described relative to considering only a 4-bit output produced in response to the following 8-bit input operand values applied to detector 10-500:

| POL | 0 | 1 | 2 | 3 | 4 | 5 | 6 | 7 |      |       |
|-----|---|---|---|---|---|---|---|---|------|-------|
| 0   | 1 | X | X | X | X | X | X | X | 0000 | 0 (N/A) |
| 0   | 0 | 1 | X | X | X | X | X | X | 0001 | 1     |
| 0   | 0 | 0 | 1 | X | X | X | X | X | 0010 | 2     |
| 0   | 0 | 0 | 0 | 1 | X | X | X | X | 0011 | 3     |
| 0   | 0 | 0 | 0 | 0 | 1 | X | X | X | 0100 | 4     |
| 0   | 0 | 0 | 0 | 0 | 0 | 1 | X | X | 0101 | 5     |
| 0   | 0 | 0 | 0 | 0 | 0 | 0 | 1 | X | 0110 | 6     |
| 0   | 0 | 0 | 0 | 0 | 0 | 0 | 0 | 1 | 0111 | 7     |
| 0   | 0 | 0 | 0 | 0 | 0 | 0 | 0 | 0 | 1000 | 8     |
| 1   | 0 | X | X | X | X | X | X | X | 0000 | 0 (N/A) |
| 1   | 1 | 0 | X | X | X | X | X | X | 0001 | 1     |
| 1   | 1 | 1 | 0 | X | X | X | X | X | 0010 | 2     |
| 1   | 1 | 1 | 1 | 0 | X | X | X | X | 0011 | 3     |
| 1   | 1 | 1 | 1 | 1 | 0 | X | X | X | 0100 | 4     |
| 1   | 1 | 1 | 1 | 1 | 1 | 0 | X | X | 0101 | 5     |
| 1   | 1 | 1 | 1 | 1 | 1 | 1 | 0 | X | 0110 | 6     |
| 1   | 1 | 1 | 1 | 1 | 1 | 1 | 1 | 0 | 0111 | 7     |
| 1   | 1 | 1 | 1 | 1 | 1 | 1 | 1 | 1 | 1000 | 8.    |

The outputs of each of the 8 to 3 encoder circuits produce a three bit code which corresponds to the low order three bits of each set of bits. It is seen that the first three bits designate the first non-ZERO and first non-ONE bit positions for positive and negative operands respectively.

The most significant bit position value generated by the combinatorial logic circuits to indicate when the input operand contains no non-ZERO bit thereby eliminating any ambiguity. The 0th bit position of the input operand bits has a value of ZERO and ONE respectively for positive and negative operands.

The same procedure is used in generating the 5-bit code for a 32-bit input operand. More specifically, the first 5 bits which are applied to outputs POS0 through POS4 identify the location of the first non-ZERO and first non-ONE bit position. This is accomplished by combining within the logic circuits 10-522, the priority encoder circuit OUT0, OUT1, OUT2 and enable outputs as shown in FIG. 2b. Briefly, the logic circuits OR together, the four sets of three outputs of the priority circuits to generate the three least significant bits. The remaining three bits are generated from the enable outputs of the priority encoder circuits. From this, it will be seen that bits 1 and 2 (POS1 and POS2) identify which group (i.e., priority encoder circuit) contains the first ONE bit. Bits 3-5 (POS3-POS5) identify the position of the first ONE bit within the group.

If the binary ONE exists in the input to the first priority encoder circuit, the circuit shuts off the remaining circuits. However, if the input is all ZEROS then the second encoder circuit is enabled. Hence, the enable outputs are used to designate which one of the four encoder circuits detected the first non-ZERO bit. Therefore, the upper bits are used to denote the non-ZERO bit position.

The state of bit position 0 should always be a binary ZERO since it corresponds to the state of the 0th or sign bit.

The sixth bit position is generated by combining the priority encoder circuit EN0 and the result of ORing all enable outputs within the logic circuits 10-522. As in the above example, the state of the sixth bit position is used to indicate when the input operand contains no non-ZERO bit thereby eliminating any ambiguity.

Figure 3:
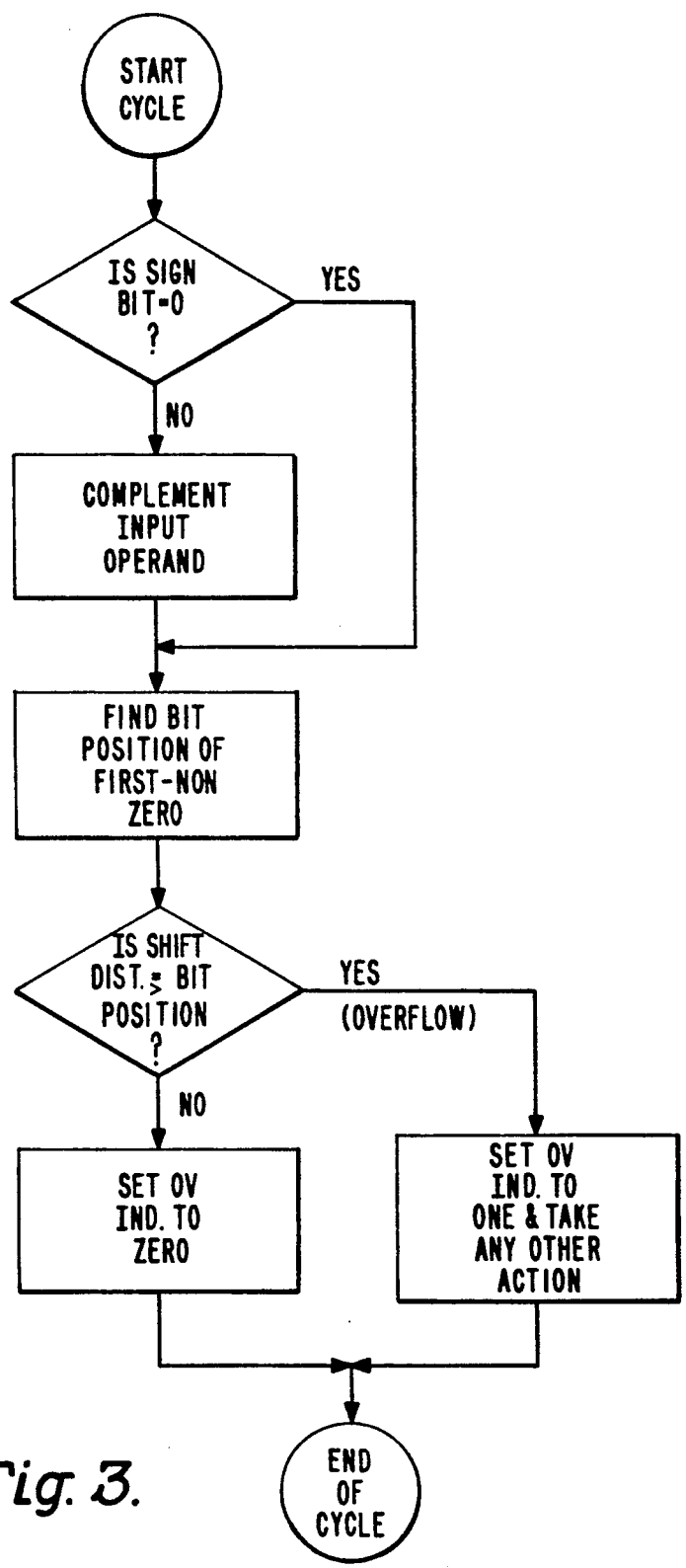
FIG. 3 is a flow diagram used to describe the overall operation of the detector of the present invention.

FIG. 3 illustrates the overall operation of the overflow detector 10-500. As shown, the first operation performed in carrying out a shift left arithmetic instruction is to determine whether or not the input operand being shifted is positive or negative. As seen from FIG. 1, the 32 bit input operand signals are applied through the SIN2 switch as an input to shifter 10-440 and the priority encoder module 10-510 of overflow detector 10-500 as shown. At the same time, the 5-bit code specifying the number shifts to be performed on the input operand is applied through the SHFTCTL switch as an input to the shift control circuits 10-420 and the comparator module 10-610 of overflow detector 10-500.

As seen from FIG. 2a, the state of signal POLSEL corresponding to the sign bit determines whether the input operand signals are applied in the same or in complemented form. If the sign bit equals ZERO, the operand is positive and the signals are applied to the circuits 10-520 in their original form. When the sign bit equals ONE, the EX-OR circuits are conditioned to apply the signals in inverted or complemented form as shown in FIG. 3. The priority encoder circuits 10-521a through 10-512d operate to locate the first non-ZERO or non-ONE bit position and generate the appropriate 6-bit code on lines POS0-POS5 as shown in FIG. 2b.

The comparator module 10-610 compares the 6-bit code with the 6-bit code consisting of the 5-bit shift code and a binary ZERO bit in bit position 0. When the shift distance is determined to be equal to or greater than the bit position value, an overflow condition is signaled and the OV indicator flip-flop 10-710 is set to a binary ONE state in response to a microinstruction command CMD at the middle of the CPU cycle. However, when the shift distance is less than the bit position value, no overflow condition is signaled and the OV flip-flop 10-710 is set to a binary ZERO state in response to the command signal CMD.

From the above, it is seen how the overflow detector of the present invention is able to detect an overflow condition in parallel with the execution of arithmetic instructions within a single cycle of operation. By using standard modules, the overflow detector can be implemented with relatively small amount of circuits.

It will be appreciated that many changes may be made to the preferred embodiment of the present invention without departing from its teachings. For example, the invention is not limited to the use of a particular type of arithmetic unit, shifter, or technology. Also, the invention is not limited to determining an overflow condition by detecting a first non-ZERO or ONE.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of detecting an overflow condition by an overflow detector as a result of performing a left shift operation on an input operand by a shifter within a single cycle of operation, said input operand consisting of a plurality of bits including a sign bit which corresponds to the most significant bit of said input operand and a predetermined umber of data bits, said method comprising the steps of:
   (a) detecting by a priority encoder module a first predetermined change of state in the input operand bits and generating a first binary code value designating the bit position in which the change of state was detected relative to the location of said most significant bit of said input operand;
   (b) comparing by comparison circuits, said first binary code value of step (a) with a second binary code value designating a number of shifts to be performed on the input operand in executing the left shift arithmetic operation; and,
   (c) generating by said comparison circuits, an output signal for indicating the presence of said overflow condition when said comparing of said first and second binary code values indicate that said second binary code value designating the number of shifts is equal to or greater than said first binary code value generated in step (a) designating the number of available bit positions.

2. The method of claim 1 wherein said priority module includes a plurality of priority encoders and combinatorial logic circuits and wherein step (a) includes the steps of:
   (d) dividing the plurality of bits into said plurality of groups of bits, each group being applied to a different one of said plurality of priority encoders and, each group having the same number of bits;
   (e) encoding each group of bits by said different one of said priority encoders into a binary code designating the occurrence of a first non-ZERO position in succession; and,
   (f) combining the different binary codes by said combinational logic circuits so as to produce said first binary code value.

3. The method of claim 1 wherein said first predetermined change corresponds to locating the bit position relative to said most significant bit of a first non-zero bit occurring within the data bits of said input operand having a sign bit value designating that said input operand is positive and said step (a) includes the step of applying said input operand bits in their original form in parallel to said shifter and said overflow detector.

4. The method of claim 1 wherein said first predetermined change corresponds to locating the bit position relative to said most significant bit of the first non-ZERO bit occurring within the data bits of said input operand having a sign bit value which designates that said input operand is negative and said step (a) includes the steps of complementing said input operand bits and applying the complemented bits in parallel to said shifter and said overflow detector.

5. The method of claim 1 wherein said first predetermined change is detected in said input operand bits in original and complemented form.

6. An overflow detector for detecting an overflow condition while a unit is performing a shift left arithmetic operation on an input operand including a sign bit and a number of data bits, said overflow detector comprising:
   a priority encoder module connected in parallel with said unit for receiving said sign and data bits of said input operand, said module including input means and output means, said input means for detecting a first predetermined change of state in said input operand bits and said output means generating a first binary code value designating the bit position in which the change of state was detected by said input means relative to the location of said sign bit; and,
   a comparator module including input means and output means, said input means being connected to encoder output means for receiving said first binary code value and a second binary code value designating a number of shift to be performed on the input operand, said comparator mode output means generating an overflow signal when comparing said first and second binary code values indicates that said second binary value designating the number of shifts is equal to or greater than said binary code value designating the number of available bit positions.

7. The overflow detector of claim 6 wherein said overflow detector further includes an indicator module connected to said output means of said comparator module for receiving said overflow signal, said indicator module in response to a command received prior to the completion of said shift operation being operative to switch to an active state indicting the presence of said overflow condition.

8. The overflow detector of claim 6 wherein said priority encoder module input means including means for complementing said input operand bits as a function of the state of said sign bit.

9. The overflow detector of claim 8 wherein said means for complementing includes a plurality of exclusive or circuits, each circuit being connected to receive a different one of said operand bits and said sign bit, said each circuit providing said different one of said operand bits in uncomplemented and complemented form respectively, when said sign bit is in an inactive and active state.

10. The overflow detector of claim 8 wherein said plurality of bits are divided into a number of groups of bits, each having the same number of bits and wherein said priority encoder module further includes a plurality of priority encoder circuits, each connected to said input means for receiving a different one of said number of groups, each priority encoder circuit being connected in tandum so that a first one of said number of encoder circuits which detects said first predetermined change of state inhibits remaining ones of said encoder circuits thereby speeding up detection of said overflow condition.

11. The overflow detector of claim 10 wherein each priority encoder circuit of said priority encoder module encodes said group of bits into n number of bits where n is a whole integer wherein 2 to the nth power equals the number of bits in said group.

12. The overflow detector of claim 11 wherein said priority encoder module further includes combinatorial logic circuits connected to said priority encoder circuits for receiving said n number of bits from each priority encoder circuit and signals indicating when certain ones of said encoder circuits have been enabled, said logic circuits generating said binary code value having n+1 bits designating said bit position for application to said output means.

13. The overflow detector of claim 12 wherein said combinatorial logic circuits includes circuits for generating an additional bit thereby providing said n+1 bits for indicating a predetermined characteristic of said input operand bits so as to avoid an ambiguity.

14. The overflow detector of claim 13 wherein said predetermined characteristic is that said input operand applied to said detector circuit has an all ZERO or all ONE value.

* * * * *